Jan. 24, 1956   P. A. JOHNSON ET AL   2,732,192
INDUSTRIAL WATER COOLING SYSTEM
Filed Dec. 14, 1953
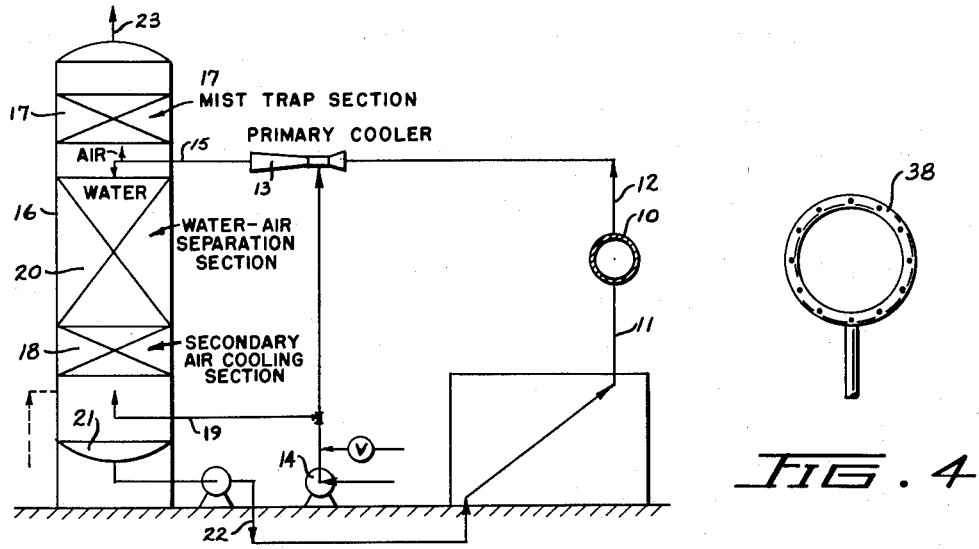
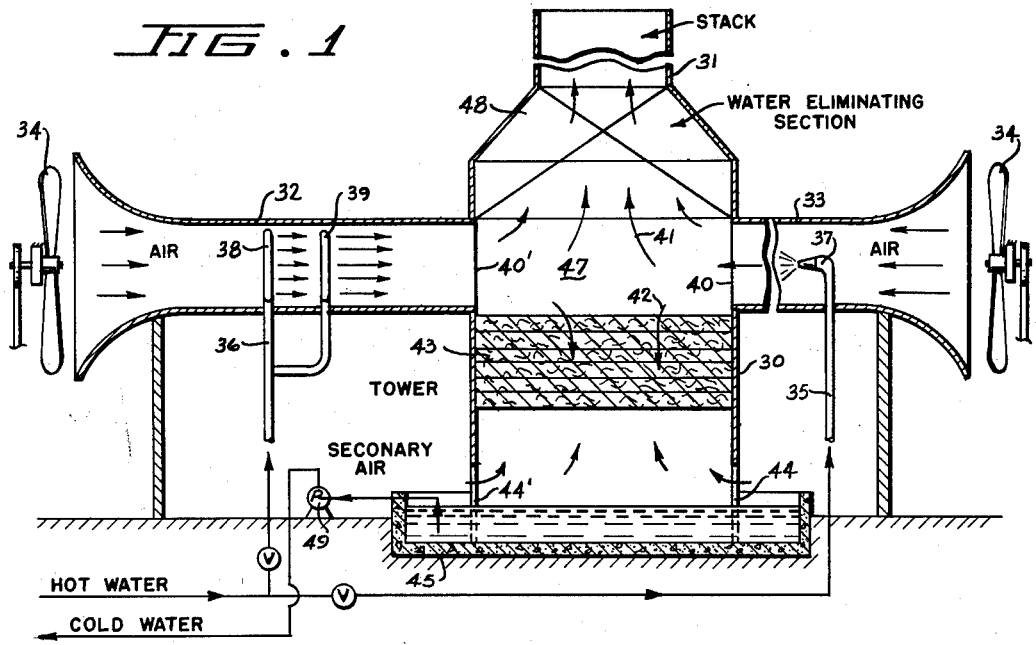
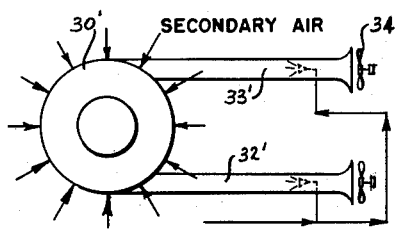
INVENTORS
PAUL A. JOHNSON
PAUL C. JOHNSON
BY
ATTORNEY United States Patent Office
2,732,192
Patented Jan. 24, 1956

2,732,192
INDUSTRIAL WATER COOLING SYSTEM
Paul A. Johnson and Paul C. Johnson, Tarrytown, N. Y.

Application December 14, 1953, Serial No. 397,990

11 Claims. (Cl. 261—23)

This invention relates to industrial apparatus for cooling hot water, or other hot liquids and to a novel method for cooling the hot water or other hot liquids employed in industrial plants. The new apparatus and method may also be employed for non-industrial use. The invention is particularly adapted for use in industrial plants in which large quantities of water are employed for industrial cooling purposes and which must itself be cooled by contact with air, and the invention will be described in connection with such cooling means, but this particular description is not to be taken as a restriction on the generality of the application of the invention, which is equally applicable to the cooling of any liquid which is susceptible of cooling by contact with air.

The standard method of cooling hot water in industrial plants is to bring it into contact with large quantities of air at atmospheric temperature in the interior of a tower which is filled with splash decks. The cool air ascends in the tower as the hot water falls, producing counter-current cooling of the water, in this type of cooling tower, which is collected in a sump at the bottom of the tower at a temperature such that it may be used again for cooling. The efficiency of such systems depends upon the temperature which can be reached in the sump. This cooling process, in apparatus of normal efficiency, may reduce the temperature of water from 120° F. at the top of the tower to 90° F. at the sump. The efficiency of the entire plant system is increased and the cost of cooling reduced, if the temperature of the water in the sump can be still further reduced, and a further decrease in temperature of 10° and even of 5° represents a major increase in efficiency and reduction in cost of cooling equipment.

It is an object of the invention to improve the efficiency of industrial water cooling methods and to provide novel apparatus by which the improved efficiency can be attained.

The objects of the invention as to process, are obtained generally speaking by cooling the water in a first stage by admixture of a quantity of cool air sufficient to reduce its temperature, this cooling being carried out in a conduit outside a cooling tower, thereafter separating the air and water, subjecting the separated water to further cooling by air, for instance, in a counterflow cooling tower, and subjecting the air that has been used for cooling to the extraction of entrained water. The mixing conduit outside the tower may be a liquid conduit into which the first cooling air is injected, or it may be an air conduit into which the water is injected. In the first cooling stage, the flow of water and cooling air is preferably concurrent. In the second cooling stage, the flow of air and water is preferably counter-current. The air from the first cooling and the air from the second cooling are preferably mingled and pass concurrently through a packing adapted to extract entrained water. In the preferred form of the invention, the water extracted from the air, after the air has performed its cooling function, is added to the water which is undergoing the second cooling.

The accompanying drawings illustrate the invention.

In Fig. 1 is shown flow diagram of a system employing an advance cooling conduit of water-tube type into which the air is injected.

Fig. 2 is a vertical section through a preferred form of apparatus.

Fig. 3 is a plan view of a compact design for the apparatus of Fig. 2.

Fig. 4 is an elevational view of a water spray of the type employed in the preferred form of the invention.

Referring to Fig. 1, the numeral 10 represents a reaction vessel, or the like, which requires continuous cooling and which may be presumed to have a water jacket through which the cooling water from a pipe 11 is forced, the water which issues from said jacket being hot and passing through a pipe 12 to a venturi nozzle 13, into the side of which an air blower or compressor 14 forces air at atmospheric temperature. Thus, the temperature of the water is reduced, by an initial admixture, in a conduit outside the cooling tower, with a flow of air. From the mixer 13, which may, for example, be of injector or inspirator type, the mixture of air and water passes through conduit 15 into the side of a vertical tower 16, arriving in this separation section of the tower between two sections of packing 17, 18. The air and water are separated in the separation section of the tower, the water falling downward to the packing section 18, where it is broken into smaller droplets and distributed over surfaces prepared for the purpose. The packing in this section may be Raschig rings, saddle packing, splash decks, or the like. As the water flows and falls through this section, it is engaged by ascending air from a secondary source 19 which may be no more than a port in the side of the tower or may be impelled by a source such as the compressor 14. As this secondary air ascends through this section 18, it further cools the descending water.

It is thus seen that the water is first cooled by a current of air flowing concurrently, and thereafter by a current of air flowing countercurrently. This use of primary and secondary cooling air is important. The air from the secondary source passes through the separation section 20 of the tower and joins the air which has been separated from the water entering by conduit 15. All this air ascends through the mist eliminator section 17 which is also filled with splash decks, saddle packing or Raschig rings, or the like and which serves to extract water from the air. The water thus extracted from the upflowing air falls to the secondary air cooling section where it is further cooled before being delivered to the sump 21, from whence it is pumped through pipe line 22 back to the reaction vessel 10. It is simpler and cheaper to employ a stack 23 to generate the mild flow of air required than to impel the air into the bottom of the tower from a blower.

In the preferred form of the invention shown in Figs. 2 to 4, a cooling tower 30 is provided with a stack 31 and has oppositely extending air conduits 32—33 through which air is blown into the tower by fans 34. This inflowing air is mixed with hot water which enters the air conduits by injection means such as pipes 35, 36 and is sprayed concurrently with the air by nozzle 37 or rings 38, 39. A face view of such a ring is shown in Fig. 4. The mixture of air and water enters the tower through ports 40—40', the air ascends upward as shown by arrows 41 and the water flows downward as shown by arrows 42. The portion of the tower in which this separation takes place is called the "separator section." Below the separator section is a secondary cooling section 43 which may be filled with decking, saddle packing, Raschig rings or the like, the function of which is to expose more and more surface of the water to contact with the air by breaking drops into smaller drops, by spreading streams out into shallower streams having greater surface, and by inducing the drops and streams to fall repeatedly through the ascending cold air. The secondary air is admitted by stack draft, or fan discharge, through ports 44—44' above the sump 45 and flows upwardly through the secondary cooling section 43 into the separator section 47 where it joins the air which leaves the mixture formed in tubes 32—33, and the combined air, containing entrained moisture, enters a water eliminating section 48 in a superior part of a tower where the entrained water is stripped and falls down into the secondary cooling section 43 while the air, released of its water passes out through the stack 31. The cold water in the sump is taken by a pump 49 and delivered to the plant for use. Section 48 may be packed like section 17.

In Fig. 3 is shown a form of the invention in which the ducts 32'—33' are brought parallel for reasons of constructional and power efficiency.

The conditions inside the apparatus are very mild and do not require any substantial expenditure of power. For example, a pressure, generated by fans 34 at the entrance to the air ducts 32—33, of about a quarter inch of water would be adequate for most circumstances. Stack pressure is zero or trifling. The velocity of water and air at nozzle 37 may be on the order of 80–90 feet per second. The water may be sprayed; it need not be atomized. A stack having a diameter of approximately 8 to 9 feet, extending 12 to 15 feet above a tower of 14 feet diameter, more or less, and a height of 16 to 19 feet, producing a draft of ¼ inch water pressure at ports 44—44' will produce a water temperature at the sump considerably closer to the wet bulb temperature of the surrounding atmosphere than is now possible with existing methods. The water returned to the plant from the sump is cooler than that which is produced by known units under like conditions. The efficiency of the unit is greater and this efficiency is reflected in lower costs of cooling and lower plant operating costs. The flow of water and air can be accurately controlled so that optimum conditions can be continuously maintained.

One disadvantage of present type cooling towers is the channeling of air and water and such channeling is eliminated by this invention.

Another advantage is that the gear boxes which are required on present types of cooling towers are eliminated, and their cost is saved. Furthermore, the new apparatus has greater flexibility because it can use any desired number and arrangement of blowers, but having the same total horse power as used in present type cooling towers.

A further advantage is that a smaller cross sectional area is required than in present types of cooling tower, which reduces the cost. The computations to determine cost and efficiency are made on a basis of cross section of the tower and they show a material improvement in favor of this invention.

As many apparently widely different embodiments of the present invention may be made without departing from the spirit and scope thereof, it is to be understood that the invention is not limited to the specific embodiments.

What is claimed is:

1. Method of cooling the hot water of an industrial cooling system that comprises first mixing cool air and the hot water together by spraying the hot water and blowing cool air together horizontally and concurrently, introducing the horizontally flowing air and water into a secondary, vertically moving current of air and separating the air and water, allowing the separated water to fall through the ascending air, receiving and extending the water separated from said mixture on a series of downwardly progressing, extending surfaces over which such secondary air is flowing countercurrent to the general direction of flow thereof.

2. Method of cooling the hot water of an industrial cooling system that comprises first flowing a stream of cool air and spraying hot water concurrently and thereby mixing them, the air being admixed in quantity sufficient to materially reduce the temperature of the water, thereafter separating the said air and much of its entrained water, distributing the separated water in relatively extensive streams and flowing cool air thereover in a direction generally countercurrent thereto, and mingling the air from the separation with the air from the cooling of the said relatively extensive streams of water, extracting entrained water therefrom, and further cooling such extracted water.

3. Method of cooling the hot water of an industrial cooling system that comprises cooling the water by admixture in concurrent flow with a quantity of cool air sufficient to materially reduce its temperature, separating such air from water by sharply changing its direction of flow, extending the separated water in thin sheets and drops, subjecting the extended water to further cooling by cool air in quantity sufficient to further reduce its temperature, and separating entrained water from the air issuing from both said cooling operations, and cooling it by air issuing from such further cooling.

4. Method of cooling the hot water of an industrial cooling system that comprises cooling the water in a primary stage by spraying the hot water into a moving current of cool air, concurrently therewith, such air being in a quantity sufficient to materially reduce the water temperature, separating the air and water, subjecting the separated water to countercurrent cooling by free fall through air warmer than such cool air, interrupting such free fall and extending the surface area of such falling water, and subjecting such extended water to cooling by such ascending air at cooler temperature and with flow generally countercurrent to such extended water.

5. Industrial water cooling apparatus including tower means, a plurality of upper and lower, spaced, water cooling type packings in said tower means, the upper of such packings being of water-air separation type, means to admit cool air to the tower means beneath both packings, conduit means opening into the tower means between the packings, air impeller means directed through said conduit means toward said tower means, and hot water flow means directed through said conduit toward said tower means.

6. The apparatus of claim 5 in which the conduit means is horizontal and the tower means is vertical.

7. The apparatus of claim 5 in which the conduit means comprises an air conduit with concurrently direct water injection means and air propulsion means, said conduit opening into the side of such tower between such packings.

8. The apparatus of claim 5 in which the conduit means includes a water spray and an air blower.

9. The apparatus of claim 5 in which one of the packings is above the other, the upper packing means is adapted to strip water from air, and the lower is adapted to increase the total surface of the water exposed to the cooling effect of the air admitted below both packings.

10. The apparatus of claim 5 in which the tower means comprises a vertically arranged air tunnel, and the conduit means comprises a water pipe opening into the side of said tunnel between said packings, said pipe being provided with injection means for the injection of cooling air into said pipe whereby to cool said water before admission to said tunnel.

11. The apparatus of claim 5 in which the conduit means includes oppositely directed conduits opening into the tower between said packings.

References Cited in the file of this patent

UNITED STATES PATENTS

| | | |
|---|---|---|
| 556,040 | Alberger | Mar. 10, 1896 |
| 698,013 | Halsall | Apr. 22, 1902 |
| 1,172,429 | Carrier | Feb. 22, 1916 |
| 1,739,867 | Seymour | Dec. 17, 1929 |
| 2,221,787 | Downs | Nov. 19, 1940 |
| 2,273,108 | Hibberd | Feb. 17, 1942 |
| 2,337,983 | Fisher | Dec. 28, 1943 |
| 2,571,958 | Slaughter | Oct. 16, 1951 |